United States Patent
Hirota

(10) Patent No.: US 8,592,735 B2
(45) Date of Patent: Nov. 26, 2013

(54) INDUCTION HEATING APPARATUS

(75) Inventor: Yoshiaki Hirota, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 513 days.

(21) Appl. No.: 12/527,481

(22) PCT Filed: Feb. 15, 2008

(86) PCT No.: PCT/JP2008/053008
§ 371 (c)(1),
(2), (4) Date: Aug. 17, 2009

(87) PCT Pub. No.: WO2008/099974
PCT Pub. Date: Aug. 21, 2008

(65) Prior Publication Data
US 2010/0072192 A1    Mar. 25, 2010

(30) Foreign Application Priority Data

Feb. 16, 2007   (JP) ................................. 2007-036494

(51) Int. Cl.
*H05B 6/10*    (2006.01)
*H05B 6/04*    (2006.01)
*H05B 6/36*    (2006.01)

(52) U.S. Cl.
USPC ............ 219/645; 219/646; 219/671; 219/672

(58) Field of Classification Search
USPC ......... 219/647, 645, 673, 646, 637, 624, 662, 219/671, 600, 656, 672; 118/500, 639, 715, 118/725, 730, 732
See application file for complete search history.

(56) References Cited

U.S. PATENT DOCUMENTS 4,357,512 A * 11/1982 Nishimoto et al. ............ 219/608
4,708,325 A * 11/1987 Georges .......................... 266/90

(Continued)

FOREIGN PATENT DOCUMENTS

| JP | 62-281291 A | 12/1987 |
| JP | 2002-151245 A | 5/2002 |
| JP | 2002-043042 A | 8/2002 |
| JP | 2005-011625 A | 1/2005 |

(Continued)

OTHER PUBLICATIONS

Chinese Office Action dated Jul. 20, 2011 for Application No. 200880005308.8.

*Primary Examiner* — Henry Yuen
*Assistant Examiner* — Hung D Nguyen
(74) *Attorney, Agent, or Firm* — Birch, Stewart, Kolasch & Birch, LLP

(57) ABSTRACT

An induction heating apparatus for controlling the temperature distribution for heating a metal plate irrespective if it has a small thickness, is magnetic or nonmagnetic, and capable of coping with a change in the width of the plate, or meandering of the plate. The apparatus heats a metal plate 1 by induction heating, which passes through the inside of induction coils 2, wherein in a vertical projected image of the conductors on the metal plate 1, the conductors 2*a* and 2*b*, parts of the induction coil, placed on the front surface side and the back surface side of the metal plate 1, the conductors 2*a* and 2*b* on the front surface side and the back surface side are arranged so as to be deviated from each other in the lengthwise direction of the metal plate 1, the edge portion of at least either the conductor 2*a* on the front surface side of the metal plate 1 or the conductor 2*b* on the back surface side thereof is arranged aslant or arcuately, and magnetic cores 10 are arranged at the outer sides of the induction coils 2.

6 Claims, 16 Drawing Sheets

(56) References Cited

U.S. PATENT DOCUMENTS

| | | | |
|---|---|---|---|
| 4,795,872 A | 1/1989 | Hagisawa et al. | |
| 6,285,015 B1 * | 9/2001 | Doizaki et al. | 219/645 |
| 2002/0148830 A1 * | 10/2002 | Ross | 219/670 |
| 2006/0124633 A1 | 6/2006 | Roehr et al. | |
| 2007/0235446 A1 * | 10/2007 | Cao et al. | 219/645 |

FOREIGN PATENT DOCUMENTS

| | | |
|---|---|---|
| JP | 2005-522014 A | 7/2005 |
| JP | 2005-209608 A | 8/2005 |
| WO | WO-2006-088067 A1 | 8/2006 |
| WO | WO-2006/088068 A1 | 8/2006 |

* cited by examiner

Fig.1 - PRIOR ART
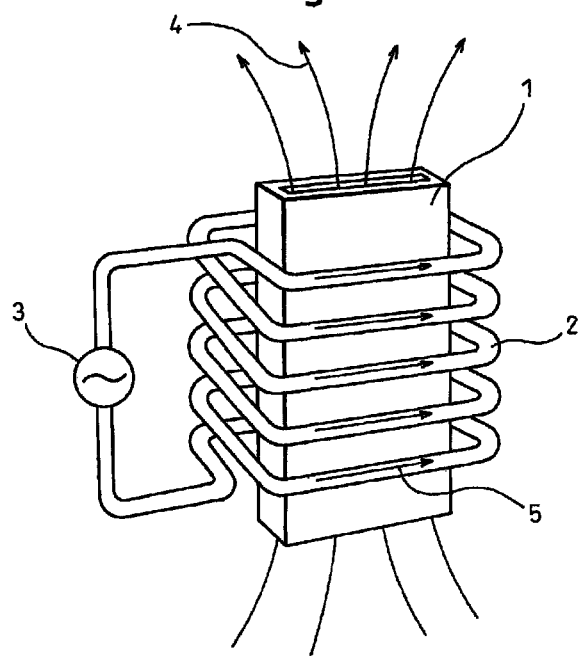
Fig.2 - PRIOR ART
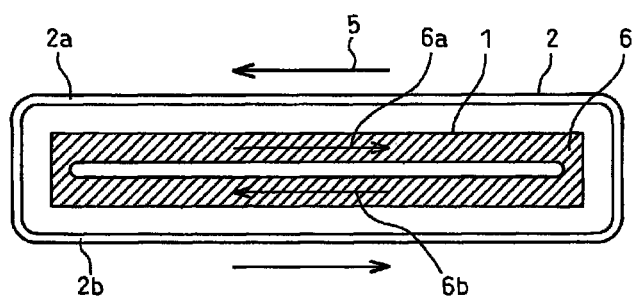

Fig.3 - PRIOR ART
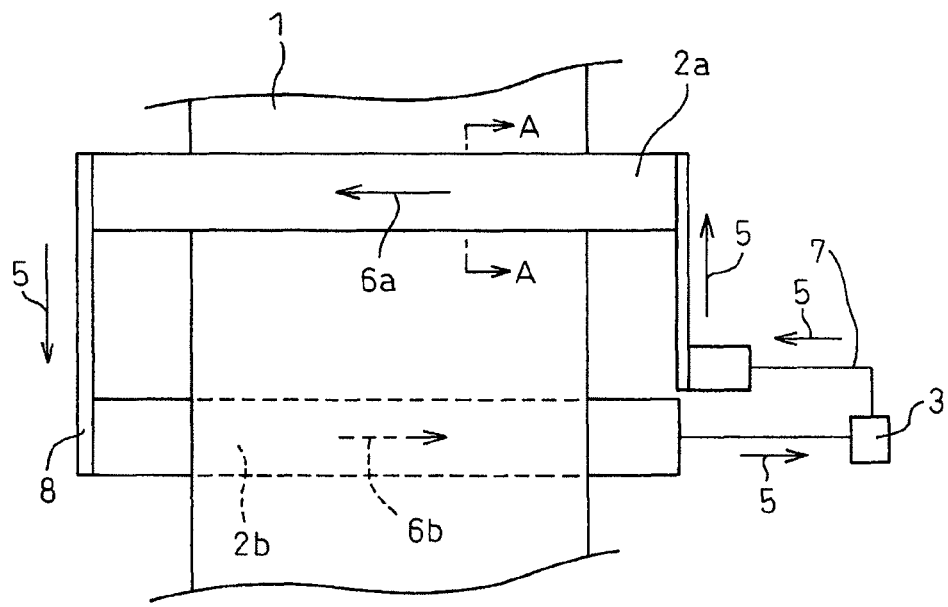
Fig.4 - PRIOR ART
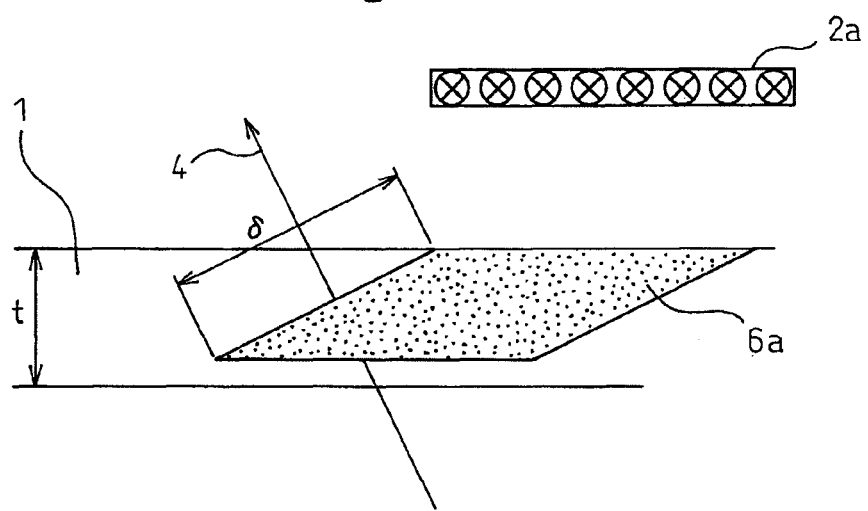

Fig.5 - PRIOR ART
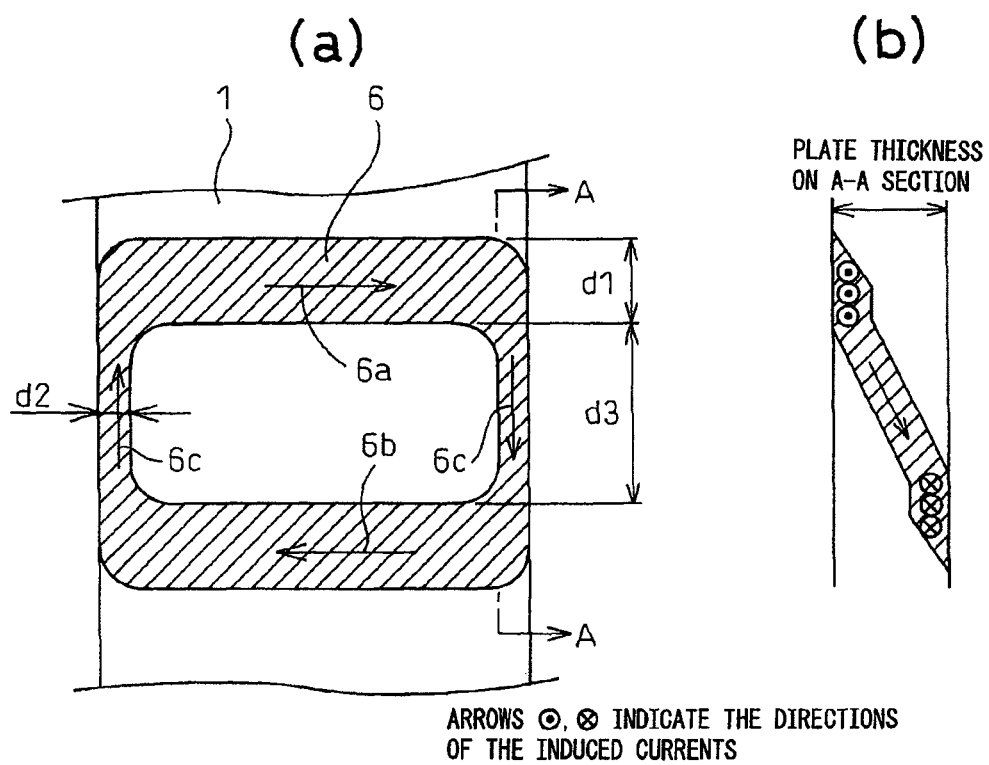
ARROWS ⊙, ⊗ INDICATE THE DIRECTIONS
OF THE INDUCED CURRENTS Fig.9
(a)
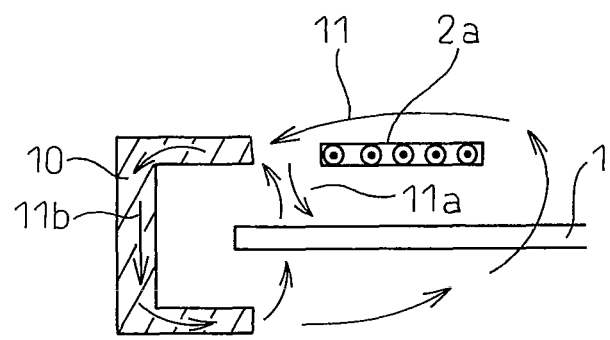
(b)
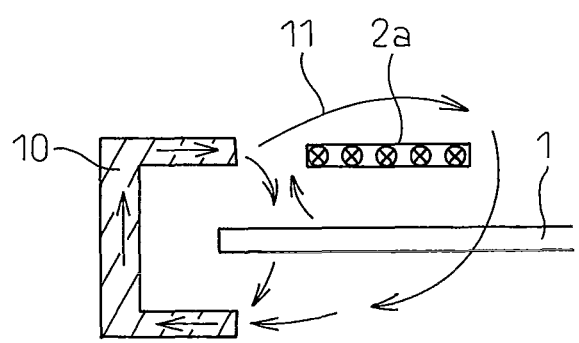

Fig.18
(a)
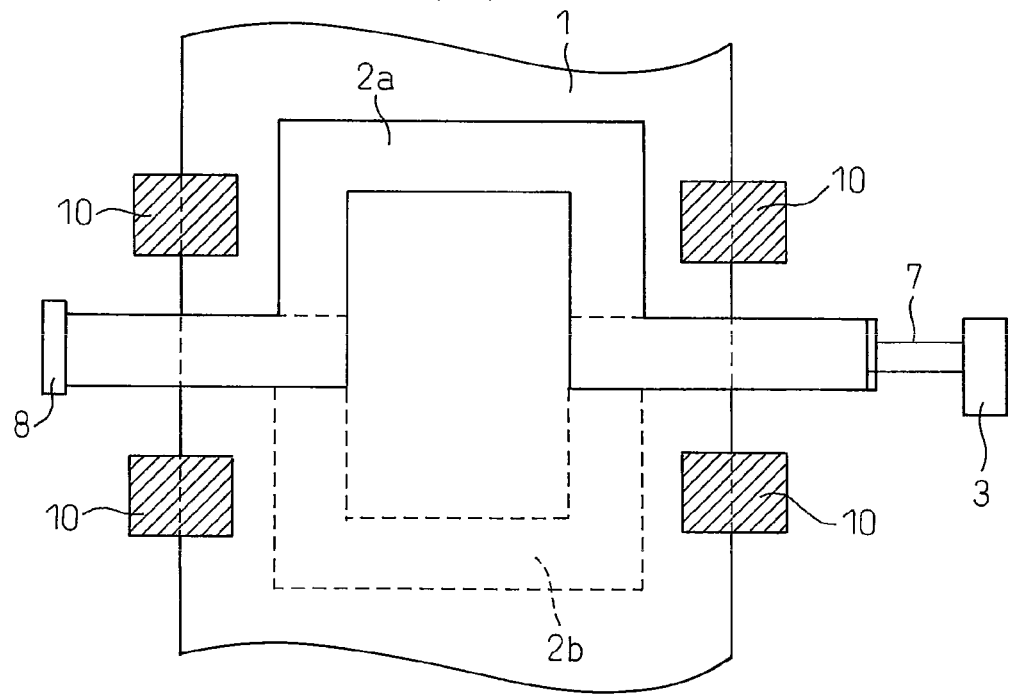
(b)
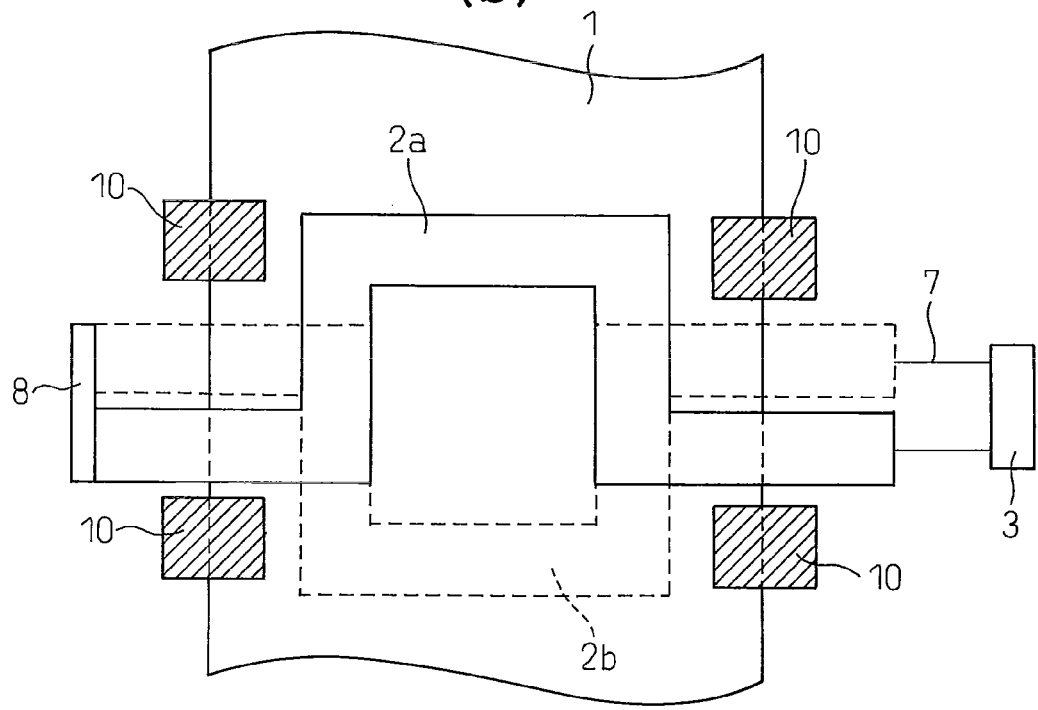

Fig.22
(a)
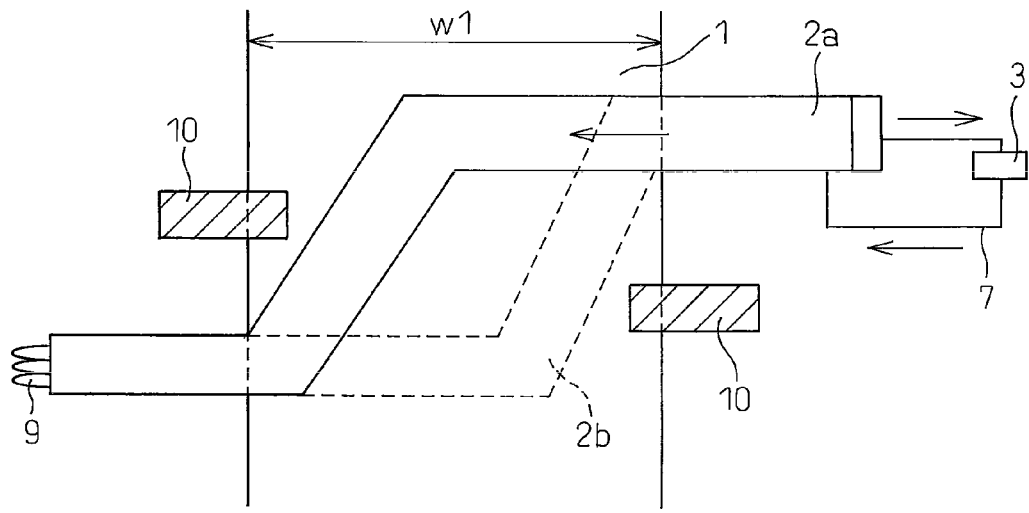
(b)
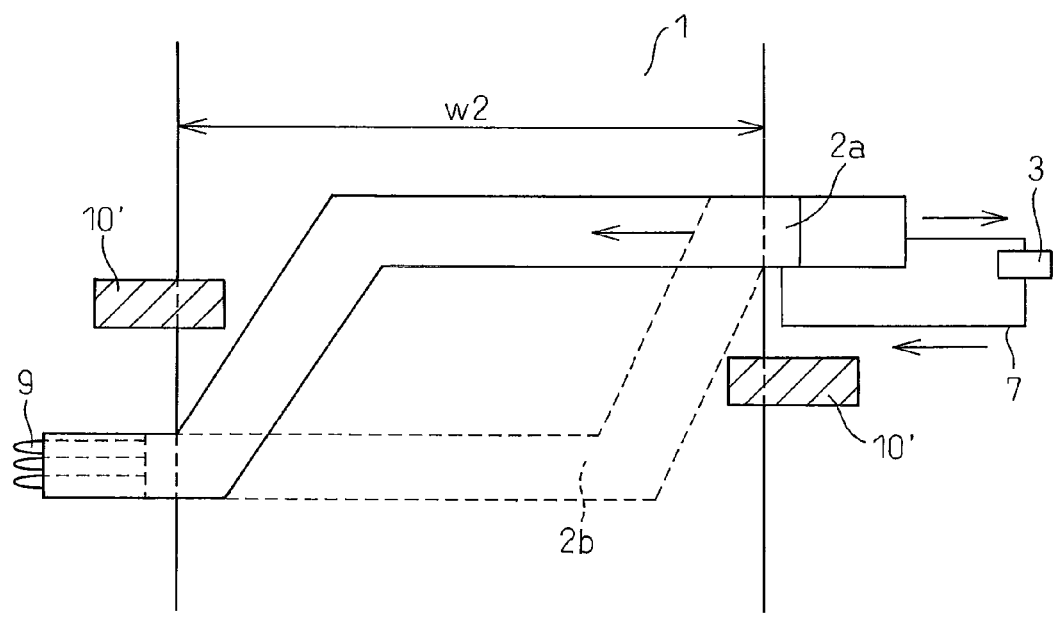

INDUCTION HEATING APPARATUS

TECHNICAL FIELD

This invention relates to an induction heating apparatus for steel plates and non-ferrous metal plates such as aluminum. Particularly, the invention relates to an induction heating apparatus for efficiently heating metal plates irrespective of whether the metal plates are thin plates or thick plates and even in a non-magnetic state while suppressing overheating and precisely controlling the temperature at the edge portions of the metal plates.

BACKGROUND ART

Induction heating of metals by utilizing a high-frequency current has been widely used for heat treatment, such as hardening and the like. Induction heating is employed for controlling the quality of the metals when producing thin metal plates and non-ferrous metal plates, such as steel plates and aluminum plates, as well as for increasing productivity by increasing the rate of heating and for freely adjusting the amount of production. Induction heating has been used as a substitute for conventional indirect heating, which uses gas or electricity.

Induction heating of metal plates can be roughly divided into two systems. One is an induction heating system, which is a so-called LF (longitudinal flux heating) system in which a high-frequency current is flown into an induction coil surrounding the metal plate, and the generated magnetic flux passes through the metal plate in the lengthwise direction thereof to induce a current in the sectional surface of the metal plate to heat the metal plate. Another one is a TF (transverse flux heating) system in which a metal plate is arranged between magnetic materials called inductors on which the primary coils are wound, and the magnetic flux generated by flowing a current into the primary coils is permitted to pass through the inductors so that the magnetic flux flowing between the inductors traverse the metal plate so as to induce a current on the plane of the metal plate to thereby heat the metal plate by induction.

Induction heating by the LF system has a good uniformity in the temperature distribution. However, the induced current circulates in the cross section of the plate and when the plate has a small thickness, the current is not induced unless the frequency of the power source is increased due to current penetration depth. In addition, nonmagnetic materials and magnetic materials having a small thickness cannot be heated if the temperature exceeds their Curie points since the penetration depth of current increases.

The induction heating by the TF system, on the other hand, has a feature in that the metal plate can be heated irregardless if it is a magnetic plate or nonmagnetic plate since the magnetic flux passes through the plane of the metal plate. In addition, use of inductors having low reluctance makes it possible to decrease the leakage of magnetic flux and to concentrate the magnetic flux between the inductors facing the front surface and the back surface of the metal plate enabling the heating to be more efficient to be enhanced.

However, there remains a problem in that the temperature distribution tends to be less uniform. In addition, if the metal plate is not at the center between the opposing inductors, the magnetic plate is attracted by either inductor, and the temperature tends to further deviate.

Further, induction heating by the TF system results in defects such as it is difficult to vary the width of the metal plate and it becomes difficult to handle the metal plate in case it meanders on a continuously processing line.

In order to solve these problems, JP-A-2002-43042 discloses coils of a single turn that are arranged in a deviated manner on the front surface and back surface of a band in a direction of travel.

Further, JP-A-2002-151245 proposes an induction coil of a rhombic shape in which an induction heating coil facing the material to be heated has a curved long axis.

In JP-A-2005-209608, the present inventors have proposed an induction coil which surrounds a metal plate and is shifted in a direction of travel.

DISCLOSURE OF THE INVENTION

FIG. 1 is a schematic view showing the induction heating by a conventional LF system. A metal plate 1 to be heated is surrounded by an induction coil 2 connected to a high-frequency power source 3. Upon flowing a primary current 5, magnetic flux 4 passes through the inside of the metal plate 1, and an electric current is induced about the magnetic flux 4. The metal plate 1 is heated by the induced current. FIG. 2 is a schematic sectional view showing a state where a current is induced in the cross section of the metal plate 1.

The magnetic flux 4 passing through the metal plate 1 induces a current 6 in the sectional surface of the metal plate 1 in a direction opposite to the primary current 5 flowing in the induction coil 2. The induced current 6 flows being concentrated in a range of a current penetration depth δ represented by formula (1) from the surface of the metal plate 1, $$\delta[\text{mm}] = 5.03 \times 10^{+5} (\rho/\mu_r f)^{0.5} \quad (1)$$

where ρ: resistivity [Ωm],
μr: relative permeability [−],
f: heating frequency [Hz].

The induced currents 6 flow in the opposite directions depending on the front surface and the back surface of the plate as shown in FIG. 2. If the current permeation depth δ increases, the induced currents on the front surface and the back surface of the plate cancel each other, and therefore no current flows in the sectional surface of the plate.

The resistivity ρ of the metal increases with an increase in the temperature, and therefore δ increases with an increase in the temperature. Further, in ferromagnetic and paramagnetic materials, μr decreases as the temperature rises and approaches Curie points, and the μr becomes 1 as the temperature exceeds the Curie points.

The nonmagnetic material also has a μr which is 1. If the μr becomes small, current permeation depth δ increases according to formula (1) in the case of the nonmagnetic material as well as in the case of the magnetic material in a temperature zone from just before the Curie point until the Curie point is exceeded. As a result, the material to be heated having a small thickness can no longer be heated.

When the heating frequency is 10 [KHz], current penetration depths δ of various metals at normal temperature are, for example, about 1 [mm] in the case of aluminum which is nonmagnetic material, about 4.4 [mm] in the case of SUS304, and about 0.2 [mm] in the case of a magnetic steel. On the other hand, steel, which is a magnetic material, has a current penetration depth δ of about 5 [mm] at 750° C. which is in excess of its Curie point.

Therefore, in order for the front surface current and the back surface current generated in the plate not to cancel each other, the plate must have a thickness of not smaller than 10 [mm]. Further, a thickness of about 15 [mm] is required in order to efficiently introduce the power therein by the current.

Usually, heat treatment is used for plates having a variety of thicknesses from a thin plate such as a foil having a thickness of ten and several μm through up to a thick plate having a thickness in excess of 100 mm.

For example, steel plates used for automobiles and electric appliances, which are typical metal plates used in great quantities, in many cases, have thicknesses of not larger than about 3 [mm] and, particularly, not larger than 2 [mm] after having been cold-rolled. To heat these materials by the LF system, the heating frequency must be increased to not lower than several hundred [KHz]. Limitation, however, is imposed on the hardware to fabricate a power source of a large capacity and a high frequency. In many cases, it is difficult to realize a system using such high frequency on an industrial scale.

The method of JP-A-2002-43042 is considered to be a kind of TF system in which induction coils are arranged over and under the plate. The magnetic flux is alternately generated in a direction in which the metal plate travels. Since the upper and lower coils are shifted, the regions occur alternately, i.e., the regions where the magnetic flux cancels each other as they are generated by the upper and lower coils and the regions where the magnetic flux traverses the band aslant, making it possible to prevent the magnetic flux from concentrating.

Therefore, the method has effects for reducing the problem inherent in the conventional TF system in that the magnetic flux concentrates in the edge portions causing the edges to overheat. However, there still remains a problem in that there are regions where the magnetic flux cancels each other, and due to a single turn, a large current must be flown into the coil in order to introduce the power into the band and increase the field intensity. Further, the efficiency is decreased by an increased copper loss in the coil.

To increase the efficiency, the upper and lower single-turn coil must be brought close to the band as disclosed in the embodiment of JP-A-2002-43042. However, since the band that travels between the single-turn coil varies its shape or vibrates, it is difficult to heat the band over a large width and a long section while the band is traveling.

According to the method of JP-A-2002-151245, in a direction in which a metal is conveyed, an induction heating coil having the greatest expanded portion at the center in the widthwise direction is provided so as to face the surface of the metal, and the sum of the coil widths along the direction in which the metal material is conveyed is maintained substantially constant. According to the method, the metal material is heated by the magnetic flux leaking from the induction coil that faces the metal material. If the distance from the induction coil increases, there is no guarantee that the magnetic flux passes through the metal. In addition, the metal is not heated unless it is brought close to the induction coil. If the shape of the metal is bad and the distance to the induction coil varies, a large deviation in the temperature occurs.

Further, the induction coil has a rhombic shape so that the width thereof remains substantially the same in the direction of travel. The rhombic shape, however, cannot respond to a change in the width of the plate. Though a rotary mechanism is provided, the heating time is not the same in the direction of travel when the rotary mechanism is rotated and, therefore, the temperature cannot be maintained uniform. It is very difficult to realize, on an industrial scale, a rotary mechanism for a heating apparatus that flows a heavy current.

Neither of the above two patent documents are for heating in a closed loop in which metal is surrounded by an induction coil. Therefore, there is no guarantee that the magnetic flux reliably passes through the metal. Further, heating is easy affected by the distance from the induction coil, and it is difficult to control the flux density since the number of turns of the induction coil cannot be changed.

In order to overcome the defects of the above heating apparatuses, JP-A-2005-209608 discloses that induction coils surrounding a metal plate are deviated in a direction in which the metal plate travels so that there will be no interference among the independent currents induced in the metal plate under the induction coils facing the front and back surfaces of the metal plates, the currents being induced by the induction coils facing the front and back surfaces of the metal plate. This document, further, teaches that even a metal plate of a thickness smaller than the current permeation depth, a nonmagnetic metal plate, and a magnetic member, such as iron in a nonmagnetic zone at a temperature higher than a Curie point thereof can be heated. Further, since the induction coils surround the metal plate confining it therein, the magnetic flux crosses the metal plate offering a great practical advantage in that the metal plate can be easily heated even if there is a space between the plate and the induction coils.

However, the current induced at the center of the metal plate tends to concentrate when it flows through the edge portions of the metal plate, i.e., a current of a high density flows and the induced current flowing through the edge portions for an extended period of time since the front and back induction coils are separated. Therefore, the edge portions of the plate tend to overheat, and the conditions (amount of deviation between the front and back induction coils, width of induction coils, etc.) are limited for obtaining a distribution with a small temperature deviation.

The above three systems are capable of controlling the nonmagnetic heating, but are difficult to precisely control the temperature distribution for heating. If the systems are installed for the existing furnaces, deformation of the metal plate makes it difficult to narrow the gap between the metal plate and the induction coils. It is, further, difficult to appropriately respond with a change in the width of the metal plate or meandering of the metal plate.

In order to control a current flowing through the edge portions of a plate, the present inventors have proposed in WO 2006/088067 and WO 2006/088068 a method of controlling the density of a current flowing through the edge portions of the plate and a heating time by, for example, slanting the induction coil at the edge portions of the plate, and a method to cope with the meandering and change in the width of the plate. The methods of WO 2006/088067 and WO 2006/088068 can control the temperature distribution to a great extent compared to the above three systems, but still do not eliminate the temperature deviation among the edge portions of the metal plate and the central portion thereof to a sufficient degree depending upon some conditions.

The present invention is to solve the problems related to induction heating of the metal plates inherent in the conventional LF systems and the TF systems. It is, therefore, an object of the present invention to provide an induction heating apparatus for not only magnetic materials but also nonmagnetic materials and the nonmagnetic zone and also metal plates having a thickness of not greater than 10 mm by using an induction coil maintaining a sufficiently large gap between the metal plate and the induction coil, offering more excellent temperature controllability than that of the induction heating apparatuses disclosed in the above WO 2006/088067 and WO 2006/088068, making it possible to effectively respond to the changing in width and meandering, and thereby result in good heating efficiency.

The gist of the present invention is as follows.

(1) An induction heating apparatus for heating a metal plate that travels through the inside of an encircling induction coil, wherein in a vertical projected image of the conductors on the metal plate, the conductors, parts of the induction coil, placed on the front surface side and the back surface side of the metal plate, the conductors on the front surface side and the back surface side are arranged so as to not overlap each other in the lengthwise direction of the metal plate in the central portion of the metal plate in the widthwise direction thereof;

the conductor of at least either the front surface side or the back surface side is arranged so as to be slanted relative to the widthwise direction of the metal plate, or the conductors on the front surface side and the back surface side are arranged so as to be at least partly overlapped each other in the vertically projected images in the lengthwise direction of the metal plate, at least at either edge portion of the metal plate in the widthwise direction thereof; and a magnetic core is arranged from the front surface side over to the back surface side of the metal plate bestriding the edge portion of the metal plate, on the outer side of the conductor that is arranged so as to be slanted, or on the outer side of a portion of the conductor that is connecting the central portion of the conductor with the edge portion of the conductor that is so arranged as to be at least partly overlapped each other in the vertically projected images.

(2) The induction heating apparatus as set forth in (1) above, wherein the conductors on the front surface side and the back surface side are arranged so as will not be overlapped one upon the other in the lengthwise direction of the metal plate in the central portion of the metal plate in the widthwise direction thereof, and the conductor of at least either the front surface side or the back surface side is arranged so as to be slanted relative to the widthwise direction of the metal plate or the conductors on the front surface side and the back surface side are arranged so as to be at least partly overlapped one upon the other in the lengthwise direction of the metal plate at least at either edge portion of the metal plate in the widthwise direction thereof; and wherein the magnetic core is arranged from the front surface side over to the back surface side of the metal plate bestriding the edge portions of the metal plate so as to produce flows of magnetic flux that cancel minor loops of a current formed together with a passage of an induced current corresponding to the shape of arrangement of the conductor, the minor loops induced at the outer side of the conductor that is so arranged as to be slanted, or on the outer side of the conductor that is connecting the central portion of the conductor with the edge portion of the conductor that is so arranged as to be at least partly overlapped each other on a plane of the metal plate that is heated by induction.

(3) The induction heating apparatus as set forth in (1) or (2) above, wherein the vertically projected image of the conductors is of the shape of a hexagon, a trapezoid, a parallelogram, a rectangle, in which central portions of the vertical projected image are parallel, a circle, an ellipse or parallel lines.

(4) The induction heating apparatus as set forth in any one of (1) to (3) above, wherein the magnetic core is so provided as to cover the front surface side and back surface side of the edge portion of the metal plate.

(5) The induction heating apparatus as set forth in any one of (1) to (4) above, wherein the magnetic core is of the shape of a flat plate or of a U-shape in cross section.

(6) The induction heating apparatus as set forth in any one of (1) to (5) above, wherein the positions of the magnetic cores are variable relative to the metal plate.

(7) The induction heating apparatus as set forth in any one of (1) to (6) above, wherein the conductor of at least either the front surface side or the back surface side can be moved in the widthwise direction of the metal plate, and the magnetic cores move being interlocked to the conductors.

The "lengthwise direction of the metal plate" referred to in the present invention stands for a direction in which the metal plate passes (the same direction as the conveyer line).

The induction heating according to the present invention makes it possible not only to heat a plate material having a large thickness and a thin plate in the magnetic region but also to heat non-ferrous metal plates, such as nonmagnetic aluminum and copper, having small resistivities as well as magnetic materials such as iron and the like which lie in the nonmagnetic region at temperatures higher than their Curie points, which cannot be heated by the conventional induction heating systems.

Further, use of the magnetic cores together with the induction coil can suppress or prevent overheating at the edge portions of the metal plate.

Upon adjusting the positions of the magnetic cores and the overlapping of the front and back magnetic cores on the edge portions of the metal plate, further, the temperature distribution for heating can be easily and accurately controlled.

Moreover, products of high quality can be produced maintaining stability by effecting the heating at a rate maintaining a temperature distribution that meet the required metallurgical properties, such as effecting the heating maintaining a desired temperature distribution in order to eliminate temperature deviation brought from the preceding step in the induction heating apparatus and by taking into consideration the temperature characteristics in the subsequent steps, thus eliminating the effect upon the quality caused by fluctuation in the operation.

In addition, since there is no effect of thermal inertia that is a problem in a furnace heated by gas, it is possible to freely control the rate of heating even when it is required to vary the temperature in the furnace due to changing the thickness of the plate, changing the width of the plate and changing the kind of the material. Accordingly, there is no need of varying the speed for passing the plate. Therefore, there is no need for using a tie that is, usually, used in the furnace heated by gas until the furnace is stabilized when the temperature in the furnace is varied. Accordingly, the production can be continued without decreasing the speed for passing the plate avoiding a decrease in the productivity and contributing to greatly increasing the freedom for planning the operation.

Moreover, the induction heating apparatus according to the invention is capable of not only coping with a change in the thickness and width of the plate but also flexibly meets fluctuating factors such as meandering, and offers such advantages as not only obtaining a desired temperature distribution but also obviating the need of providing a plurality of sets of induction coils to meet the plate widths, lowering the cost of facilities.

BRIEF DESCRIPTION OF THE DRAWINGS

FIG. 1 is a schematic view showing a conventional LF-type induction heating;

FIG. 2 is a schematic sectional view illustrating an induced current that flows in the cross section of a thin metal plate according to the conventional LF-type induction heating;

FIG. 3 is a schematic plan view illustrating the induction heating by arranging the front and back induction coils in a deviated manner;

FIG. 4 is a schematic sectional view illustrating how the current generates in the cross section A-A of FIG. 3;

FIGS. 5(*a*) and 5(*b*) are schematic views illustrating a current induced in a metal plate by the induction heating of FIG. 3;

FIGS. 9(*a*) and 9(*b*) are schematic sectional views illustrating the effect of the magnetic cores in the apparatus for induction heating according to the invention of FIG. 8;

FIG. 18(*a*) is a schematic plan view of an example where the front and back induction coils are arranged in the direction of travel near the edge portions of the metal plate in the apparatus for induction heating of the invention and where the front and back induction coils are overlapped one upon the other on the sides of the edge portions;

FIG. 18(*b*) is a schematic plan view of an example where the front and back induction coils are arranged in the direction of travel near the edge portions of the metal plate in the apparatus for induction heating of the invention and where the front and back induction coils are not overlapped one upon the other on the sides of the edge portions;

FIGS. 22(*a*) and 22(*b*) are views illustrating how to cope with the meandering of when the width of the metal plate has changed in the apparatus for induction heating of the invention;

BEST MODE FOR CARRYING OUT THE INVENTION

Described below with reference to the drawings are embodiments of the invention in the case of 1 T (turn) for simple description. The invention, however, is in no way limited to 1 T only but can be realized in a plurality of Ts.

Figure 8:
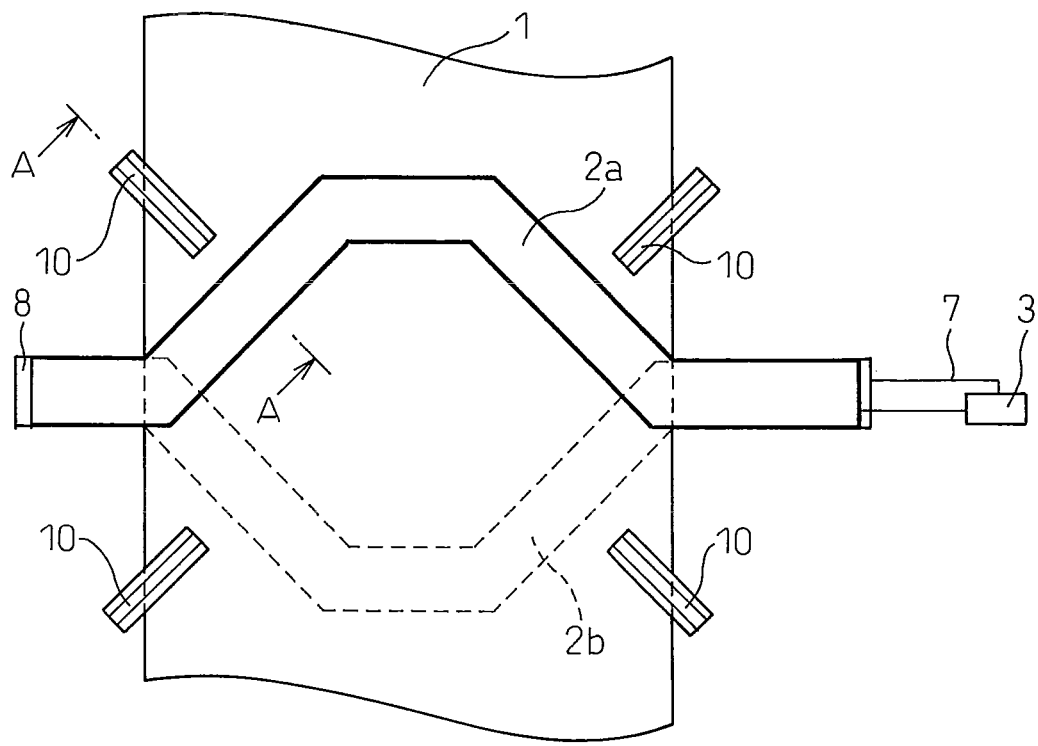
FIG. 8 is a schematic plan view illustrating an apparatus for induction heating according to the present invention.

FIG. 8 is a schematic plan view illustrating an apparatus for induction heating according to the present invention, and FIGS. 9(*a*) and 9(*b*) are schematic sectional views along the section A-A near the edge portion of the metal plate. The induction coil of the invention described below is a general term of the coil formed by a conductor such as a pipe, a wire or a plate made from a good electric conductor, and is encircling a material to be heated by one or more turns. The shape of encircling the material to be heated may be a rectangular shape or a circular shape without any particular limitation. The material of the conductor is, desirably, copper or aluminum having good electric conduction.

In the present invention as shown in FIG. 3, the conductors are so arranged that, when conductors 2*a* and 2*b*, which are parts of the induction coils, on the front surface side and the back surface side of the metal plate 1 that travels through the inside of the induction coil are vertically projected onto the metal plate, the vertically projected images of the conductors on the front surface side and the back surface side are deviated from each other in the lengthwise direction of the metal plate.

If a coil current 5 flows from a high-frequency power source 3, a magnetic flux 4 passes through the metal plate 1 diagonally and a current 6*a* is induced by the magnetic flux as shown in a side sectional view of FIG. 4 (A-A section of FIG. 3)(conductor 2*a* only is described for simplicity). Therefore, the induced current flows even if the plate thickness t is exceeded by a penetration depth δ of the current 6*a* induced by the aslant expansion of a current path.

Since the conductors 2*a* and 2*b* which are parts of the induction coil are arranged being deviated in the direction in which the metal plate travels, the current 6*a* induced by the conductor 2*a* on the front surface side and the current 6*b* induced by the conductor 2*b* on the back surface side do not interfere with each other. In the whole metal plate 1, a ring current generates as shown in FIG. 5(*a*), and the metal plate 1 can be heated even when it is made of a nonmagnetic material. FIG. 5(*b*) illustrates a cross section A-A of FIG. 5(*a*).

However, a current 6*c* that flows through the edge portions of the metal plate works to decrease the reactance to a primary current that flows through a conductor connecting the front conductor 2*a* to the back conductor 2*b* or flows through a conductor 7 that connects the front and back conductors 2*a* and 2*b* to the power source. The current 6*c* is forced to the edge portions of the plate, and therefore the current path thereof becomes narrow, whereby the magnetic flux generated by the primary current flowing through the conductors 7 and 8 passes in a concentrated manner through the edge portions having the shortest distance of the metal plate.

Therefore, the current density increases at the edge portions of the metal plate, and the edge portions of the metal plate are heated for a period of time longer than the central portion by an amount equivalent to a distance of d3 accounting for overheating at the edge portions of the metal plate.

Figure 6:
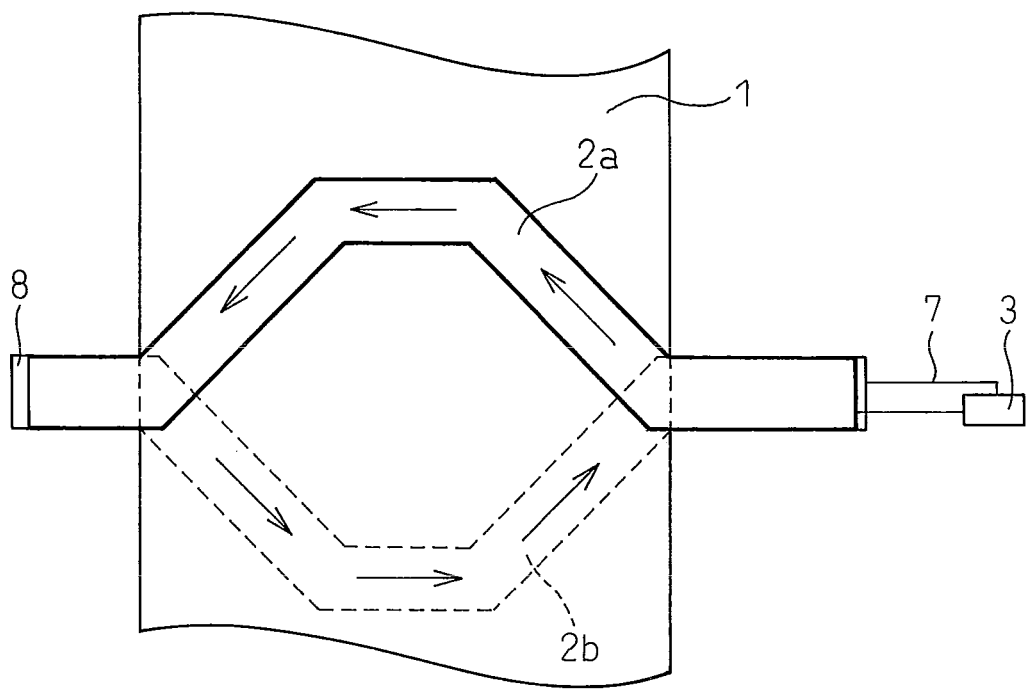
FIG. 6 is a schematic plan view illustrating an induction heating system in which the front and back induction coils are deviated at the center, and the induction coils are slanted near the edge portions of the metal plate.

According to the present invention as shown in FIG. 6, at least either the conductor 2a on the front surface side or the conductor 2b on the back surface side which are parts the induction coil facing the edge portions of the metal plate is so shaped as to traverse diagonally toward the edge portions and is arranged so as to be diagonally relative to the widthwise direction of the metal plate at the edge portions thereof. Arrows on the conductors 2a and 2b of FIG. 6 indicate directions of coil currents. FIG. 6 shows an example in which the conductors of the front surface side and the back surface side are both slanted at both edge portions of the metal plate, and have a hexagonal shape when they are vertically projected onto the metal plate. By using the induction coils of such a shape, a ring current generates in the plane of the metal plate 1 in a shape corresponding to the shape of arrangement of the conductors, i.e., nearly the same as the shape of arrangement of the conductors, and a ring current path is formed as represented by thick solid lines in FIG. 7. Arrows on the ring-like current path indicate the direction of the induced current. Therefore, the current path does not become narrow at the edge portions of the metal plate as compared to the above-mentioned case of FIG. 5, and the current density does not become high. In this example, further, the conductors forming the front and back induction coils are brought close to each other near the edge portions of the metal plate, making it possible to shorten the time of heating by the induced current flowing through the edge portions of the metal plate and to more effectively avoid overheating at the edge portions of the metal plate than when the front and back induction coils are simply deviated in parallel as shown in FIG. 3.

Figure 7:
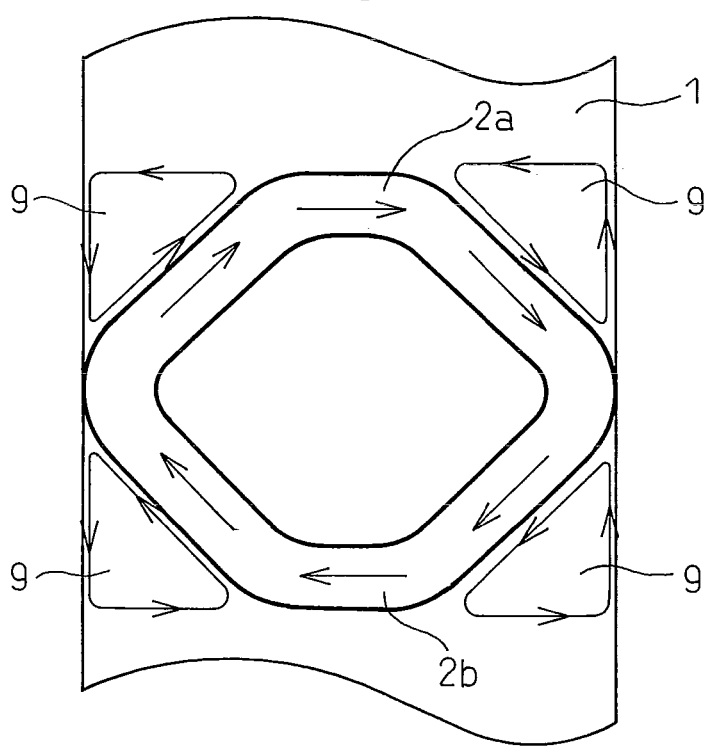
FIG. 7 is a schematic plan view illustrating a current induced in the metal plate by the coil arrangement of FIG. 6.

Through experiment and analysis, however, it is clear that though the current mainly flows through the portion surrounded by thick solid lines in FIG. 7, a portion of the current are inverted at the edge portions of the metal plate to form minor loops 9 of the induced current as shown in FIG. 7. When the heating must be conducted by strictly controlling the temperature deviation, the currents of minor groups 9 do not often become negligible. Therefore, a problem often arises concerning overheating stemming from a rise of temperature in the edge portions of the metal plate due to currents whirling in the edge portions of the metal plate.

According to the present invention, therefore, magnetic cores 10 are mounted on the outer sides of the induction coils that are slanted as shown in FIG. 8.

FIGS. 9(a) and 9(b) are schematic sectional views illustrating passages of magnetic flux generated by a primary current flowing through the conductor 2a that is a part of the induction coil along the section A-A in FIG. 8. FIGS. 9(a) and 9(b) show magnetic flux distributions depending upon the directions of the primary current. The magnetic cores 10 are arranged on the outer sides of the conductors that are placed diagonally as described above bestriding the edge portions of the metal plate from the front surface side over to the back surface side of the metal plate. Though there is no particular limitation on the shape, FIG. 9 shows an example of using the magnetic cores of a U-shape in cross section. Referring to FIG. 9(a), the magnetic core is arranged on the outer side of the conductor 2a that is a part of the induction coil at the edge portion of the metal plate 1. Near the magnetic core 10, a magnetic flux 11 generated by the primary current flowing through the conductor 2a divides into a normal magnetic flux 11a, a sub part of flux 11, which passes through the edge portion of the metal plate 1 and a flux 11b, a main part of flux 11, which passes through the magnetic core having a small reluctance. The magnetic flux 11b entering into the magnetic core 10 goes out toward the plane opposite to the plane facing the conductor 2a and, therefore, works to induce a current in the direction opposite to the direction of the current induced in the edge portion of the metal plate by the conductor 2a. Accordingly, of the current induced in the metal plate by the primary current flowing through the conductor 2a, the induced current forming a minor loop in the edge portion of the metal plate and the current induced by the magnetic core cancel each other. This results in a decrease in the current that flows in the edge portion of the metal plate when there is no magnetic core 10, and suppresses overheating in the edge portion of the plate. Even if the direction of the primary current changes as shown in FIG. 9(b), the action and effect that are exhibited are the same as those of the case of FIG. 9(a).

The magnetic core may be one having relatively large permeability and large resistivity, and generates heat little. For example, laminated electromagnetic steel plates, laminated amorphous metal plates, or a ferrite core may be used.

Figure 10:
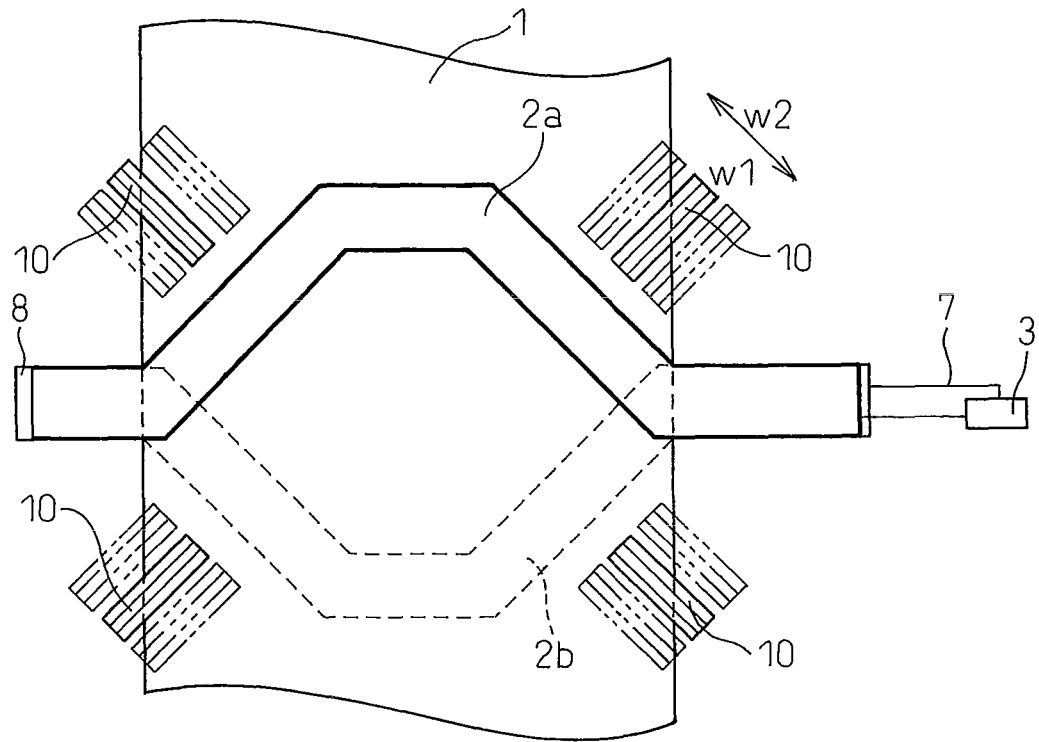
FIG. 10 is a schematic plan view of an example where the ranges of the magnetic cores covering the edge portions of the metal plate are varying in the apparatus for induction heating of the invention.

As will be understood from the above principle, the density of induced current flowing in the edge portion of the metal plate can be controlled by increasing or decreasing the area the magnetic core 10 covers the edge portion of the plate. As shown in FIG. 10, if the area where the magnetic core 10 covers the edge portion of the plate is increased by changing from a width w1 to a width w2, overheating of the metal plate can be suppressed. Further, there can be realized such a temperature distribution that the temperature becomes higher in the edge portions of the plate than in the central portion of the plate or such a temperature distribution that the temperature is uniform over the whole width of the plate. Conversely, further, there can be realized such a temperature distribution that the temperature becomes lower in the edge portions of the metal plate than in the central portion of the metal plate. Upon changing the position of the magnetic core 10 for the induction coil, further, the position changes where the current interferes with the current induced by the induction coil making it possible to vary the temperature distribution for heating.

Figure 11:
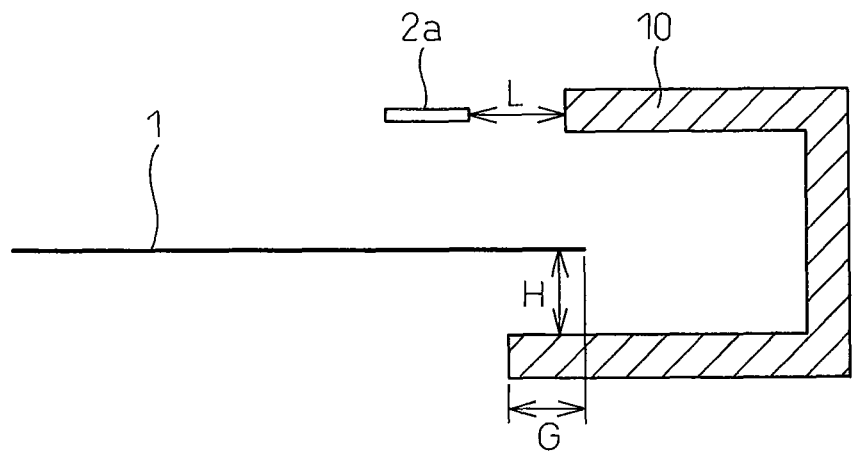
FIG. 11 is a schematic sectional view illustrating a relationship between the magnetic core and the metal plate in the invention.

The temperature distribution for heating can be, further, varied by increasing or decreasing the distance between the metal plate 1 and the magnetic core 10 with the metal plate held therebetween. That is, if the magnetic core 10 is brought close to the metal plate 1 to decrease the distance H to the metal plate 1 or to decrease the distance G by which the magnetic core enters to the inside from the edge portion of the metal plate 1 as shown in FIG. 11, the magnetic flux locally passes through the metal plate and, therefore, a change in the temperature can be locally intensified. Conversely, if the magnetic core 10 is separated away from the metal plate 1 (H or G is broadened), the magnetic flux can be distributed over a relatively wide range to mildly vary the temperature.

Figure 12:
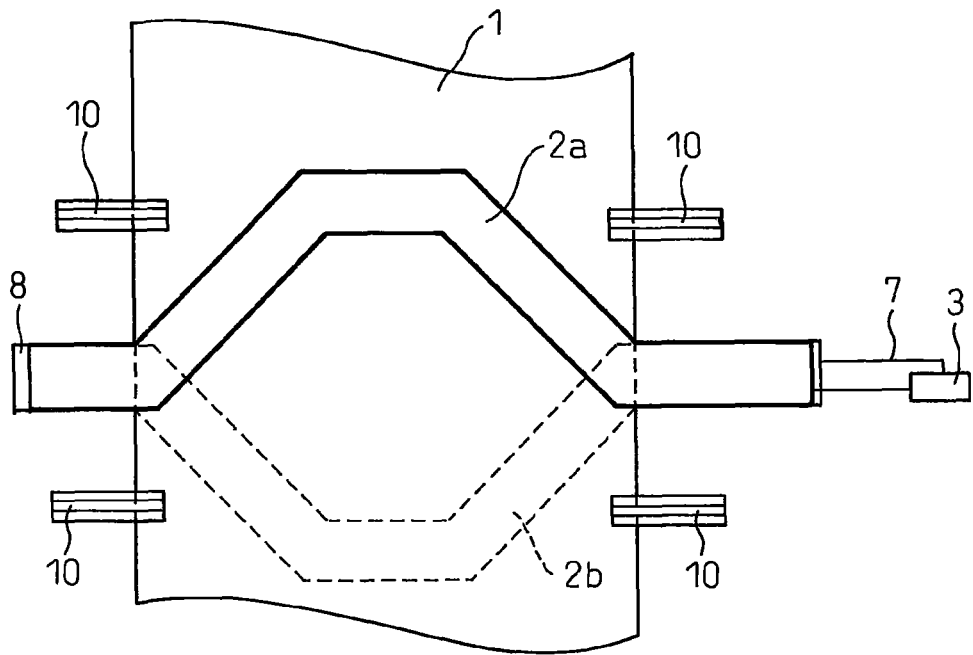
FIG. 12 is a schematic plan view of an example where the magnetic cores are not arranged vertically to the slanted induction coils in the apparatus for induction heating of the invention.

In addition to arranging at right angles with the induction coils as shown in FIG. 8, the magnetic cores 10 may be arranged in the directions at right angles with the edge portions of the metal plate as shown in FIG. 12 to obtain the effect. Though there is no particular limitation on the angles, a higher effect is obtained when the magnetic flux generated by the induction coil enters vertically into the cross section of the magnetic cores as shown in FIG. 8.

Further, when the magnetic core 10 is the one obtained by laminating electromagnetic steel plates or amorphous metal plates, the plates are so arranged that the magnetic flux passes in the direction of plate thickness so will not to induce current therein that occurs when the magnetic flux passes through the plane of the laminated material, i.e., the plates are laminated in the direction of depth (direction in which the plate is conveyed) maintaining the core shape as shown in cross sections of FIGS. 9(*a*) and 9(*b*). This arrangement offers such an advantage that the magnetic cores do not overheat or become burnt.

Figure 13:
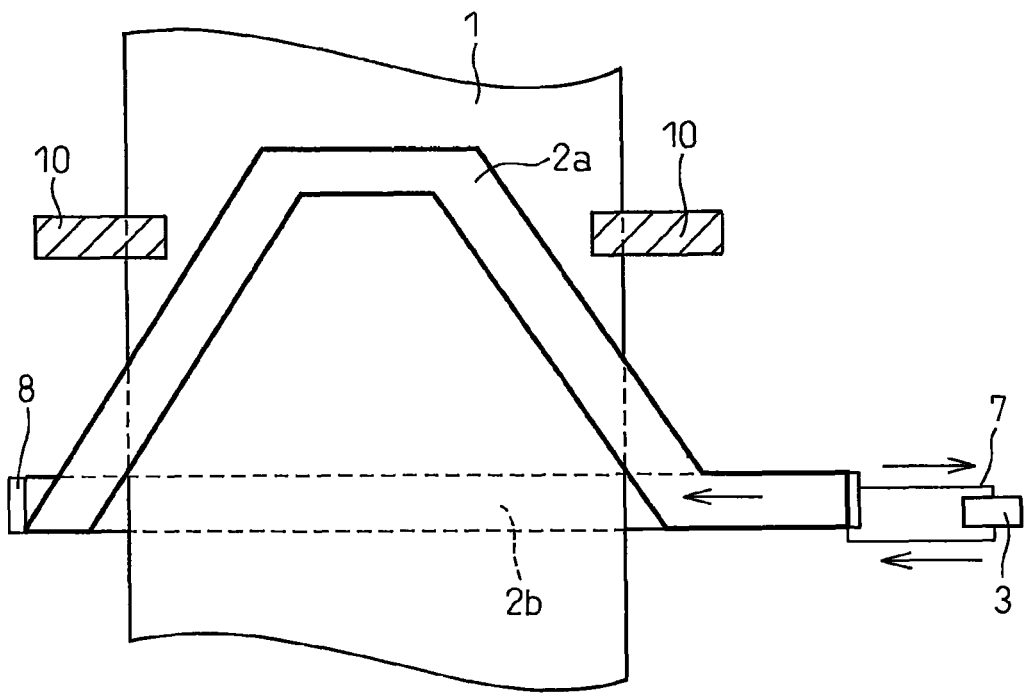
FIG. 13 is a schematic plan view of an example where the front induction coil only is slanted and faces the edge portions of the plate in the apparatus for induction heating of the invention.
Figure 14:
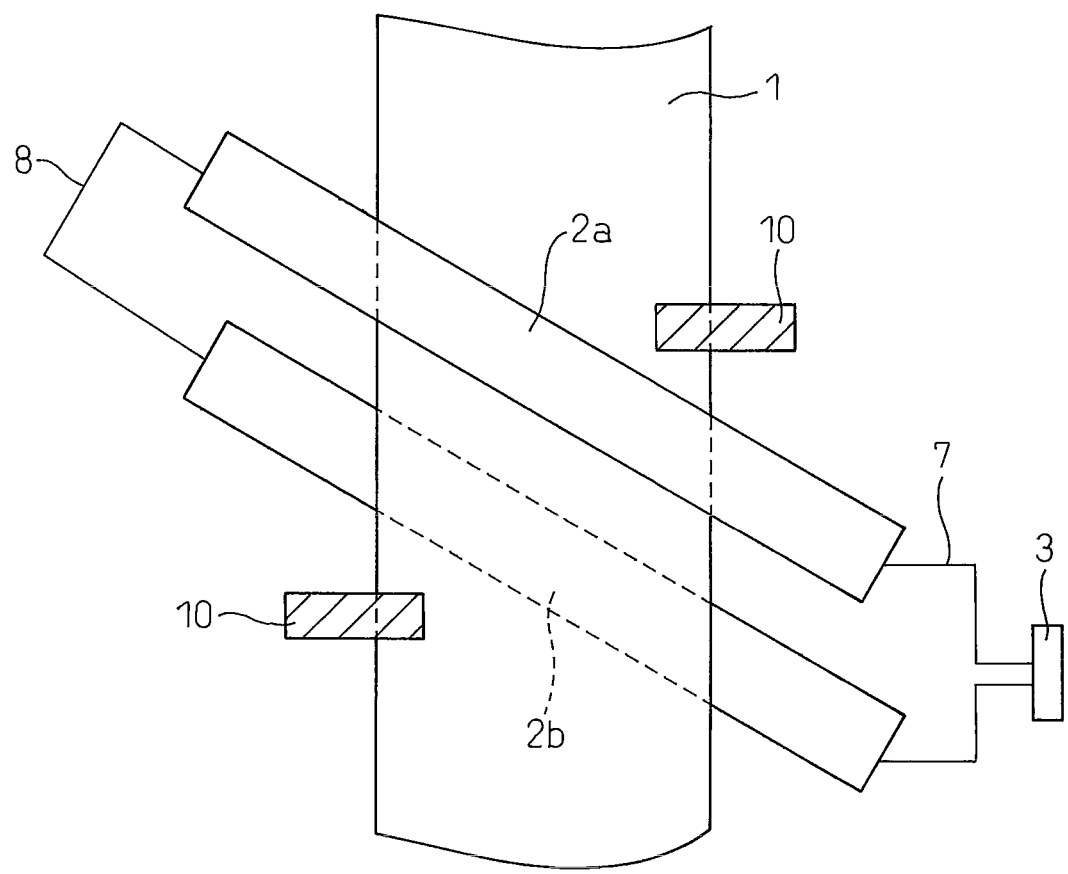
FIG. 14 is a schematic plan view of an example where the front and back induction coils are slanted and face the edge portions of the plate in the apparatus for induction heating of the invention.
Figure 15:
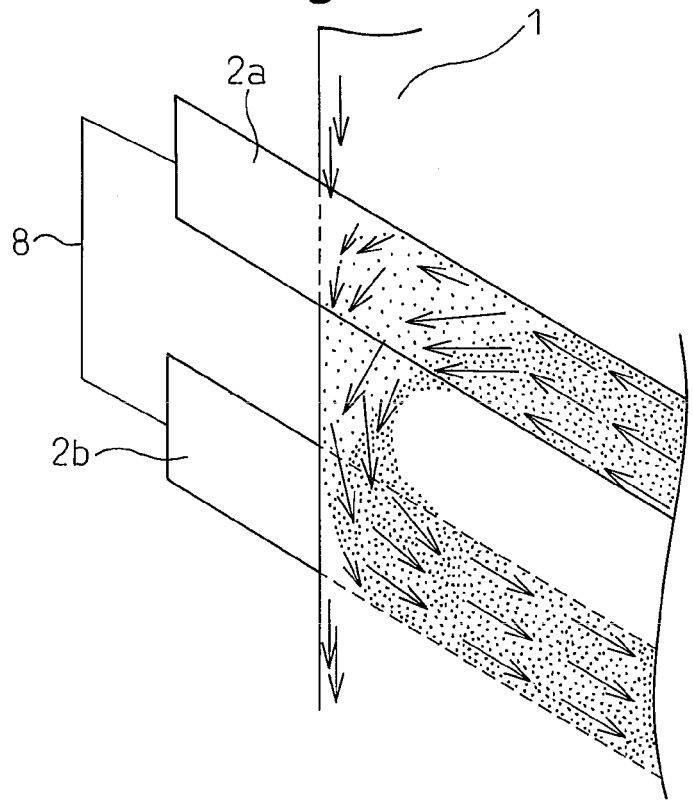
FIG. 15 is a schematic plan view illustrating a current induced in the metal plate 1 of FIG. 14.

According to another embodiment of the invention as shown in, for example, FIG. 13, the conductor 2*a* on the front side only faces the edge portions of the metal plate aslant, and the magnetic cores 10 are arranged to the outer sides of the aslant induction coil. In this example, the front and back conductors are vertically projected onto the metal plate in a trapezoidal shape. FIG. 14 shows an example in which the front and back induction coils are arranged aslant to the metal plate 1, and the magnetic cores 10 are arranged on the outer sides thereof. In this case, the front and back conductors are vertically projected onto the metal plate in a shape of parallel lines. FIG. 15 is a schematic diagram illustrating the arrangement of induction coils near the left edge portion of the metal plate of when there is no magnetic core 10 in FIG. 14 and a distribution of currents induced in the metal plate 1 by the induction coils. In FIG. 15, shade represents the distribution of current densities and arrows represent vectors of the induced currents. Upon arranging the induction coils 2*a* and 2*b* aslant to the metal plate 1, the induced current flows through a short passage prior to flowing into the edge portion of the metal plate, suppressing an increase in the current density in the edge portion of the metal plate. In this case, too, upon slanting the front and back conductors, an induced current flows in and flows out outside of the conductors to form minor loops that work to elevate the temperature in the edge portions of the metal plate. By arranging the magnetic cores on the outer sides of the induction coils, however, the induced currents forming minor loops are canceled suppressing overheating at the edge portions of the metal plate.

Figure 16:
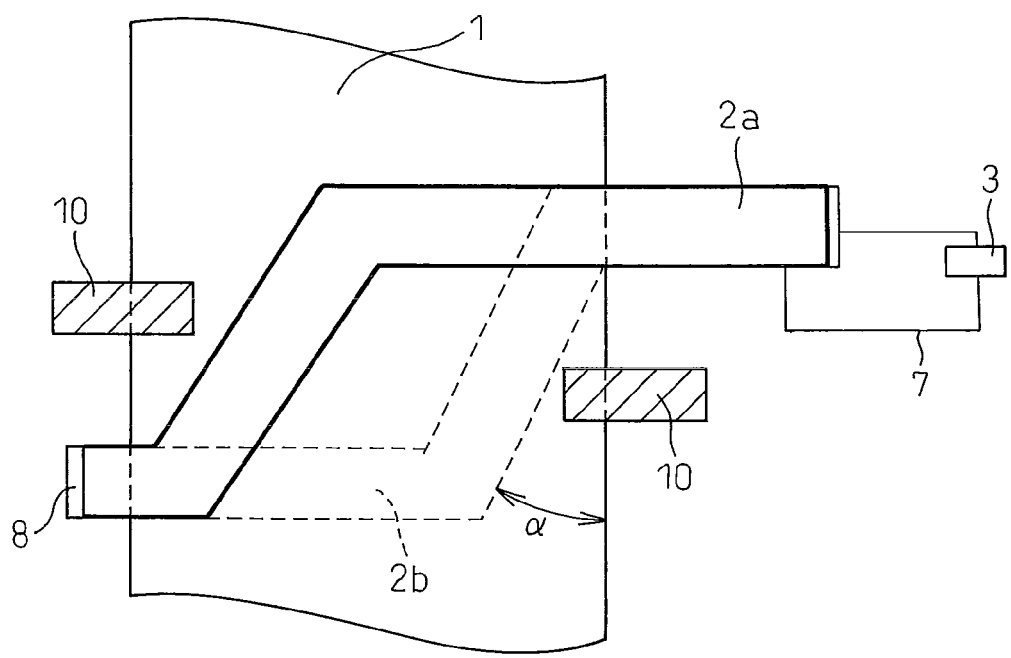
FIG. 16 is a schematic plan view of an example where the front and back induction coils are slanted along their one side only and face the edge portions of the plate in the apparatus for induction heating of the invention.

FIG. 16 shows an example in which the front and back conductors are slanted along their one side to the edge portions of the metal plate 1, and the magnetic cores 10 are arranged on the outer sides of the slanted induction coils. In this example, the front and back conductors vertically projected onto the metal plate is the shape of a parallelogram. In this example, too, induced currents (minor loops) flowing on the outer sides of the slanted portions can be suppressed.

Figure 17:
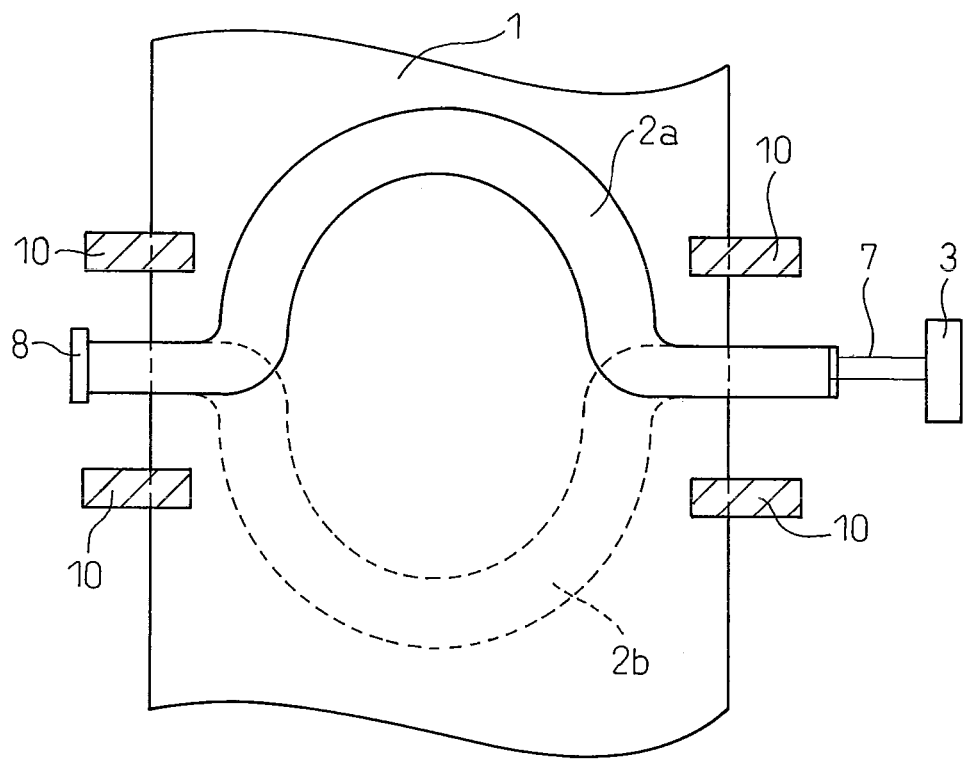
FIG. 17 is a schematic plan view of an example where the front and back induction coils are arranged in an arcuate shape on the sides of the edge portions of the metal plate in the apparatus for induction heating of the invention.

FIG. 17 shows an example of arrangement of the magnetic cores. In FIG. 17, the conductor on the front surface side of the metal plate and the conductor on the back surface side of the metal plate are so arranged as to be at least partly overlapped each other in the lengthwise direction of the metal plate on at least either edge portion of the metal plate in the widthwise direction thereof. The magnetic cores 10 are arranged on the outer side of the conductor portion connecting the central portion to the edge portion of the conductor. In FIG. 17, in particular, images of the front and back conductors vertically projected onto the metal plate are overlapped at both edge portions of the metal plate, and are formed in a circular shape as a whole. Like the above-mentioned example, this example suppresses induced currents that form minor loops that flow in the edge portions of the metal plate. FIG. 18(*a*) shows an example in which the front and back conductors are deviated in the direction of travel in the central portion of the metal plate, and are overlapped at the edge portions of the metal plate. Namely, FIG. 18(*a*) shows an example in which the front and back conductors are vertically projected onto the metal plate in a rectangular shape, and the magnetic cores 10 are arranged on the outer side of the conductor that connect the central portion of the induction coil to the edge portion thereof. Like the above-mentioned examples, this example, too, suppresses induced currents that form minor loops that flow in the edge portions of the metal plate.

In any arrangement, the front and back conductor coils do not have to be overlapped at the edge portions of the plate, as shown in FIG. 18(*b*). When the front and back induction coils are overlapped, however, no current is induced in the nonmagnetic material in the portions where they are overlapped, and therefore the temperature tends to decrease in the edge portions of the metal plate.

Figure 19:
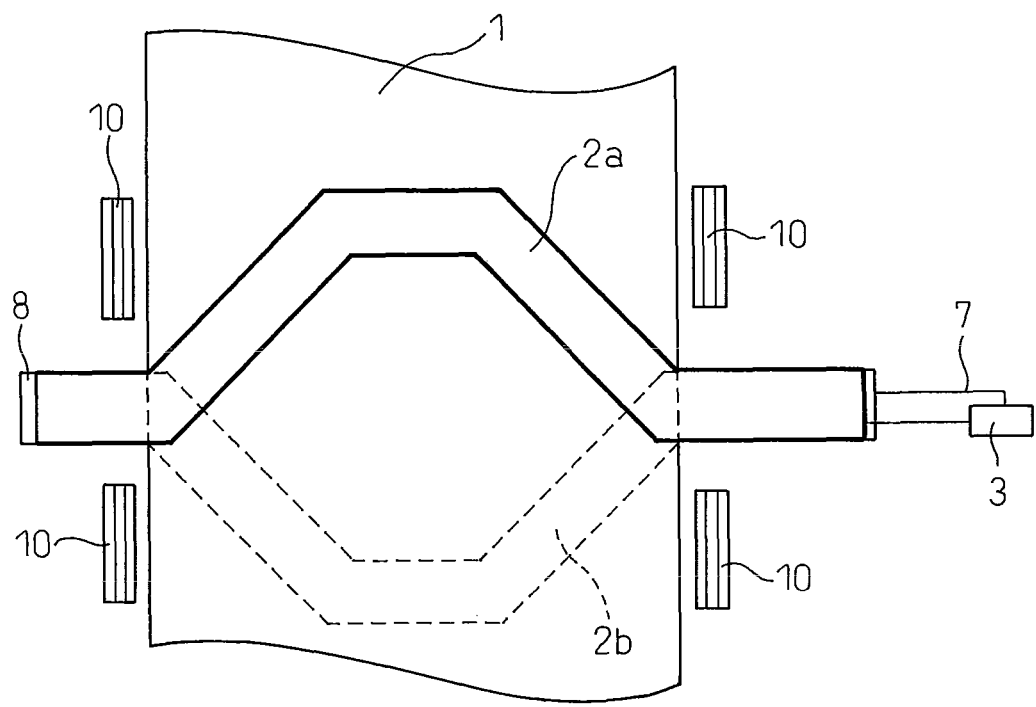
FIG. 19 is a schematic plan view of an example where magnetic cores are arranged on the outer sides of the front and back induction coils and on the outer sides of the edge portions of the metal plate in the apparatus for induction heating of the invention.

According to a further embodiment of the invention as shown in FIG. 19, the magnetic cores 10 may be arranged in a manner of not covering the edge portions of the metal plate 1. The magnetic flux generated by the induction coils passes through the magnetic cores 10 having a small reluctance and flows to the edge portions of the metal plate on the side opposite to the induction coils like when the metal plate 1 is covered by the magnetic cores 10. Therefore, the current flows in the opposite direction so as to interfere with the current generated by the induction coils and flowing in the edge portions of the metal plate to thereby suppress the overheating at the edge portions of the metal plate. However, the overheating can be more effectively suppressed when the magnetic cores 10 are so arranged as to cover the metal plate 1.

Figure 20:
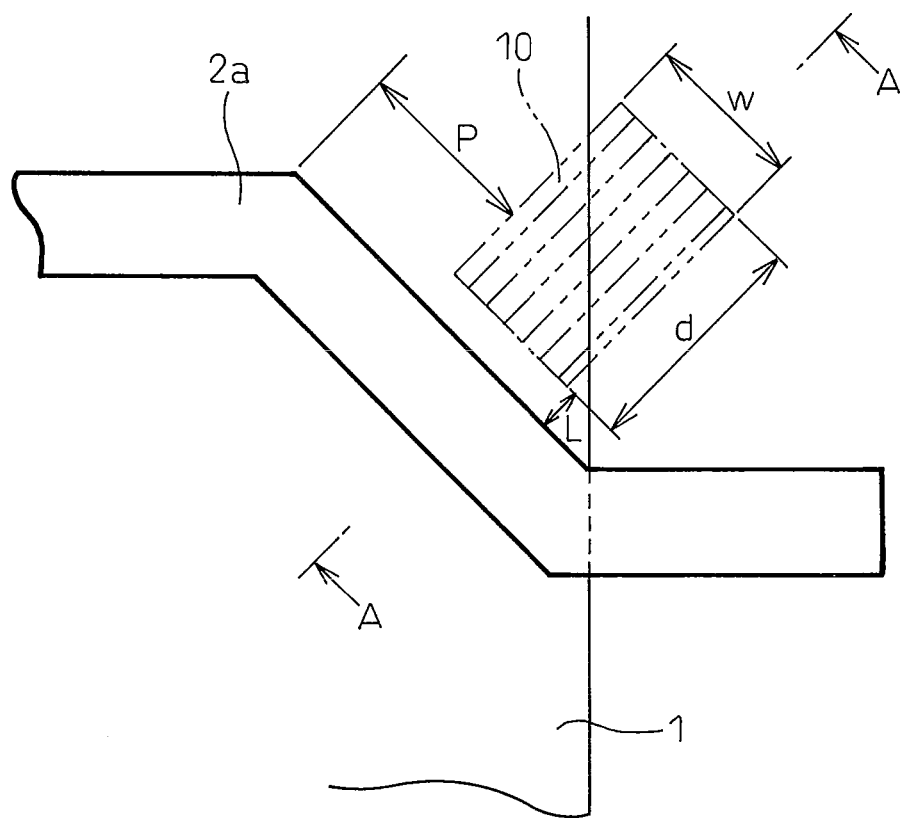
FIG. 20 is a schematic plan view illustrating a method of controlling the temperature distribution for heating by using the magnetic cores arranged near the edge portions of the metal plate in the apparatus for induction heating of the invention.

Next, described below is a method of controlling the temperature distribution for heating according to the invention. In the invention as described above with reference to FIG. 11, the magnetic flux generated by the induction coils near the edge portions of the metal plate is collected by the magnetic cores and is returned back to the surface of the metal plate on the side opposite to the induction coils in order to suppress the induced current that flows near the edge portions of the metal plate. The induced current forming a minor loop flowing on the side of the edge portions of the metal plate is decreased by inducing a current in the direction opposite to the current induced by the magnetic flux that is generated by the induction coils near the edge portions of the metal plate. In order to control the temperature distribution for heating as desired, and particularly, the temperature distribution in the edge portions of the metal plate, the amount of magnetic flux trapped by the magnetic cores 10 may be varied, or a place where the trapped magnetic flux is returned back and the density thereof may be varied so as to suppress the current flowing in the edge portions of the metal plate. FIG. 20 is a schematic partial plan view illustrating how the magnetic cores 10 be arranged when the aslant induction coil 2*a* is arranged on the metal plate 1. FIG. 11 described above is a schematic diagram that corresponds to a cross section A-A of FIG. 20. To vary the amount of magnetic flux trapped by the magnetic cores 10, the areas of cross section of the magnetic cores 10 into which the magnetic flux enters (width and thickness of the magnetic cores) may be varied, the distance (L in FIG. 20) between the magnetic cores 10 and the induction coil may be varied, or the areas of the metal plate on the outer side of the induction coils covered by the magnetic cores 10 (proportional to the product of d and w in FIG. 20) may be varied. This makes it possible to vary the amount of magnetic flux that enters into the magnetic cores 10.

As for controlling the temperature distribution for heating by returning the magnetic flux entered into the magnetic cores 10 back to the metal plate, the areas (proportional to the product of d and w in FIG. 20: d and w above the front surface and the back surface do not necessarily have to be equal to each other) of the magnetic cores 10 on the side opposite to the induction coil may be increased or decreased, the positions of the magnetic cores 10 from the edge portions of the metal plate (P in FIG. 20 or G in FIG. 11) may be varied, or the distance (H in FIG. 11) between the magnetic cores 10 and the metal plate 1 may be varied. By controlling the magnitude of the current induced by the magnetic cores 10 in the opposite direction as described above, the distribution of heat that is generated can be varied in the edge portions of the metal plate.

Figure 21:
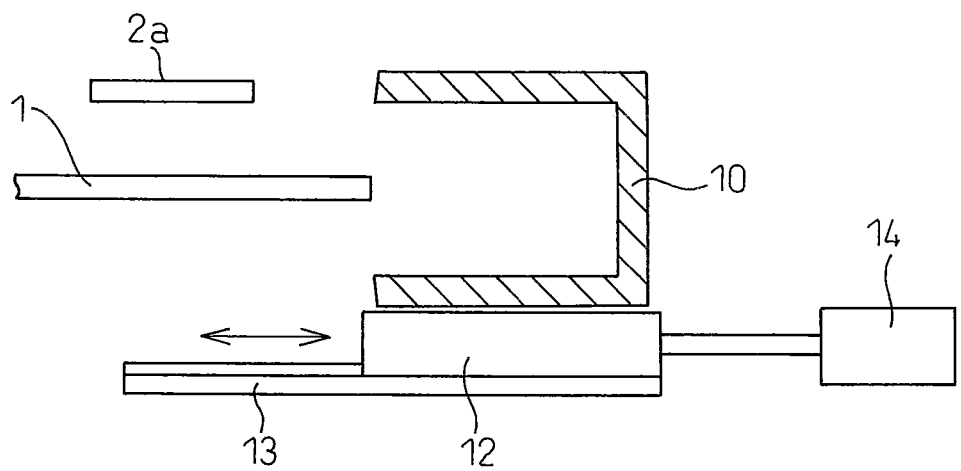
FIG. 21 is a side view of an example where the magnetic core is allowed to move in the apparatus for induction heating of the invention.

FIG. 21 shows an example of continuously controlling the horizontal distance (L in FIG. 20) between the magnetic cores 10 and the edge portions of the metal plate. The magnetic cores 10 are placed on bedplates 12 installed on a rail 13, and the bedplates 12 are moved by a driving device 14. The magnetic cores 10 are allowed to freely move to freely control the areas the magnetic cores 10 cover the metal plate 1. Therefore, if the induction heating is effected by providing a temperature-measuring device in a stage that follows the apparatus for induction heating, a desired temperature distribution can be attained. That is, if the temperature distribution is high in the edge portions of the metal plate after the heating, then the magnetic cores 10 may be pushed inward of the metal plate so as to increase the areas the magnetic cores cover the edge portions of the metal plate. Conversely, if the temperature distribution is low in the edge portions of the metal plate, then the magnetic cores 10 may be pulled out in a direction in which it separates away from the edge portions of the metal plate.

Further, the mechanism of FIG. 21 can be used for arranging the magnetic cores 10 at suitable positions in case, for example, the metal plate 1 undergoes meandering. If the moving length can be lengthened, further, the magnetic cores 10 can be set at suitable positions when the width of the plate is varied. Members for moving the magnetic cores 10 are placed at places where the magnetic field is highly intense. It is, therefore, desired that these members are made of an electrically nonconducting material such as resin or ceramics having a strength as large as possible. When it is forced to use a metal for the above members, a nonmagnetic metal material such as SUS304 should be used and a cooling structure must be employed when there is a probability of generating heat. In case the metal plate undergoes meandering, further, its position may often deviate from the preset induction coil, and the temperature may become too high or low at both edge portions of the metal plate. Even in such a case, however, the magnetic cores 10 are moved to meet the meandering of the metal plate 1 to thereby attain a desired temperature distribution for heating. To adjust the temperature, a meandering detecting device or monitoring device is installed before or after the induction heating apparatus to correctly grasp the traveling positions of the metal plate and the temperature distribution for heating. To obtain a desired temperature distribution, a device for measuring the temperature distribution is provided on the outlet side of the apparatus, and preferably, on the inlet side, too, of the apparatus in order to control the positions of the magnetic cores so as to effect suitable heating.

If the magnetic cores 10 are freely pushed into, and pulled out of, the edge portions of the metal plate, the temperature can be freely controlled at the edge portions of the metal plate. The effect of temperature control is produced when the magnetic cores are pushed in, usually, by about 50 mm from the edge portions of the plate though it may vary depending upon the electric power that is supplied, frequency and relative permeability of the metal plate. If the areas for covering the edge portions of the metal plate increase, the current induced in the metal plate 1 not only suppresses the inverted current loop 9 but also decreases the current that flows into the edge portions of the metal plate from the main current generated just under the induction coil. As a result, it is possible to decrease the amount of temperature rise in the edge portions of the metal plate than the amount of temperature rise in the central portion of the metal plate. At the time of heating the metal plate in a gas heating furnace used for heat-treating, for example, a steel plate or an aluminum plate, the temperature distribution is, in many cases, such that the temperature is high at the edge portions of the metal plate being affected by irradiation from the furnace wall or due to the removal of heat from the central portion of the plate by the conveyer rolls. When the metal plate is finally heated up to a predetermined temperature by the induction heating apparatus, the metal plate of good quality is obtained if the metal plate is heated by induction heating maintaining a heat pattern that suppresses the amount of temperature rise at the edge portions of the metal plate so that the edge portions of the metal plate will not be overheated.

Next, FIG. 22(a) and FIG. 22(b) show an example in which both the induction coils and the magnetic cores move accompanying a change in the width of the plate. FIG. 22(a) shows a shape of when the induction coils 2a and 2b are arranged being deviated in the direction of travel in a state where the plate has a width w1, and the two induction coils are aslant at their one end only facing the edge portions of the metal plate 1. The induction coils are projected in the shape of a parallelogram onto the metal plate 1. Magnetic cores 10 are provided on the outer sides of the two aslant coils.

FIG. 22(b) shows a state where the plate width is broadened to w2 from the above state. The induction coils 2a and 2b move so as to be broadened in the direction of plate width while maintaining a correlation of the positions where the aslant conductors intersect the edge portion of the metal plate. The magnetic cores, too, move with coils 2a and 2b while maintaining a relative positional relationship to the edge portions of the metal plate. Though the relative positional relationship to the edge portions of the metal plate is maintained, it is desired that the positions of the magnetic cores 10 are adjusted to some extent by using the device of FIG. 21 or the like by taking into consideration such an occurrence that the state of the metal plate 1 before being heated may vary depending upon the width of plate as described above or the temperature hysteresis in the subsequent steps. Further, the induction heating of high quality can be attained maintaining stability if the positions of the induction coils and the positions of the magnetic cores are controlled based on the data from a device for detecting the position of the metal plate 1 and a temperature-measuring device that measures the temperature distribution for heating.

As described above, the apparatus for heating and the method of heating make it possible to conduct the heating maintaining good precision irrespective of the thickness of the plate or irrespective of if the plate is magnetic or nonmagnetic. As for the frequency of the heating power source, the current induced in the metal plate tends to be dispersed and the heating efficiency decreases if the frequency is too low like the general LF-type induction heating. However, if the frequency is several KHz or higher as is normal, the heating can be efficiently conducted. Even for a thin plate, the frequency does not have to be particularly so high as to exceed 100 KHz, and a relatively low frequency can be used with an inexpensive power source which is easy to handle. If the heating is effected with a high frequency, the impedance increases and the coil voltage tends to become high. This brings about such a problem that the power source and the cables must be made resistant against high voltages. This invention, however, easily avoids this problem and greatly reduces limitation on the hardware.

According to the present invention, only a single kind of apparatus for induction heating can cover a wide range of use irrespective of the sizes and the kinds of the plates. The apparatus for induction heating of the invention not only prevents overheating at the edge portions of the plate that was a problem in the conventional apparatus for induction heating but also effects the heating while maintaining the temperature low only in the edge portions of the metal plate. Accordingly, the temperature distribution for heating can be freely controlled over the whole width of the plate. Namely, the apparatus for heating the metal plate of the invention has an excellent feature that cannot be found in the conventional counterparts making it possible to precisely control the temperature distribution.

EXAMPLES

Example 1

In order to confirm advantageous effects of the present invention, an experiment was conducted for heating a non-magnetic steel plate of SUS304 having a thickness of 0.5 mm and a width of 800 mm while passing it.

The power source that was used was a high-frequency power source of 10 KHz and a max. of 100 KW. By using a matching capacitor for adjusting the resonance frequency, matching was attained by increasing or decreasing the capacity of the matching capacitor to meet the inductance of the induction coils. The induction coils that were used were one-turn induction coils made from a water-cooled copper plate obtained by brazing a water-cooled copper pipe of an outer shape of 10 mm and an inner diameter of 8 mm onto a copper plate of a width of 150 mm and a plate thickness of 10 mm on the side (outer side) opposite to the steel plate. In this Example, the conductor includes both the copper plate and the copper pipe. A gap was 200 mm between the induction coils and the SUS 304 plate which was a material to be heated, and a gap was 350 mm between the front induction coil and the back induction coil at the central portions thereof in the direction in which the plate traveled.

The induction coils possessed the shape as shown in FIG. 16, and were deviated by 200 mm on the front and back surfaces of the steel plate at the central portions thereof in a direction in which the steel plate traveled. The aslant induction coils faced the edges at both ends at $\alpha=20°$.

Non-oriented electromagnetic steel plates were used as the magnetic cores. The experiment was conducted by melt-adhering a K-thermocouple to the material to be heated to heat the plate while passing it, and a temperature differential was evaluated between the temperature at the center of the plate and the temperature at the edges of the plate (temperature at the edges–temperature at the central portion).

The experiment was conducted by using an apparatus for induction heating having induction coils, i.e., front and back conductors 2a and 2b which were aslant at an angle of $\alpha=20°$ as shown in FIG. 16, and magnetic cores 10 arranged on the outer sides of the aslant conductors.

Figure 23:
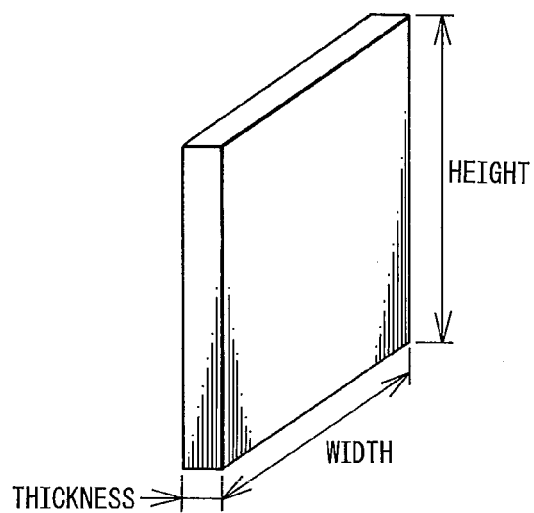
FIG. 23 is a schematic view showing the shape of a flat plate core according to the embodiment.
Figure 24:
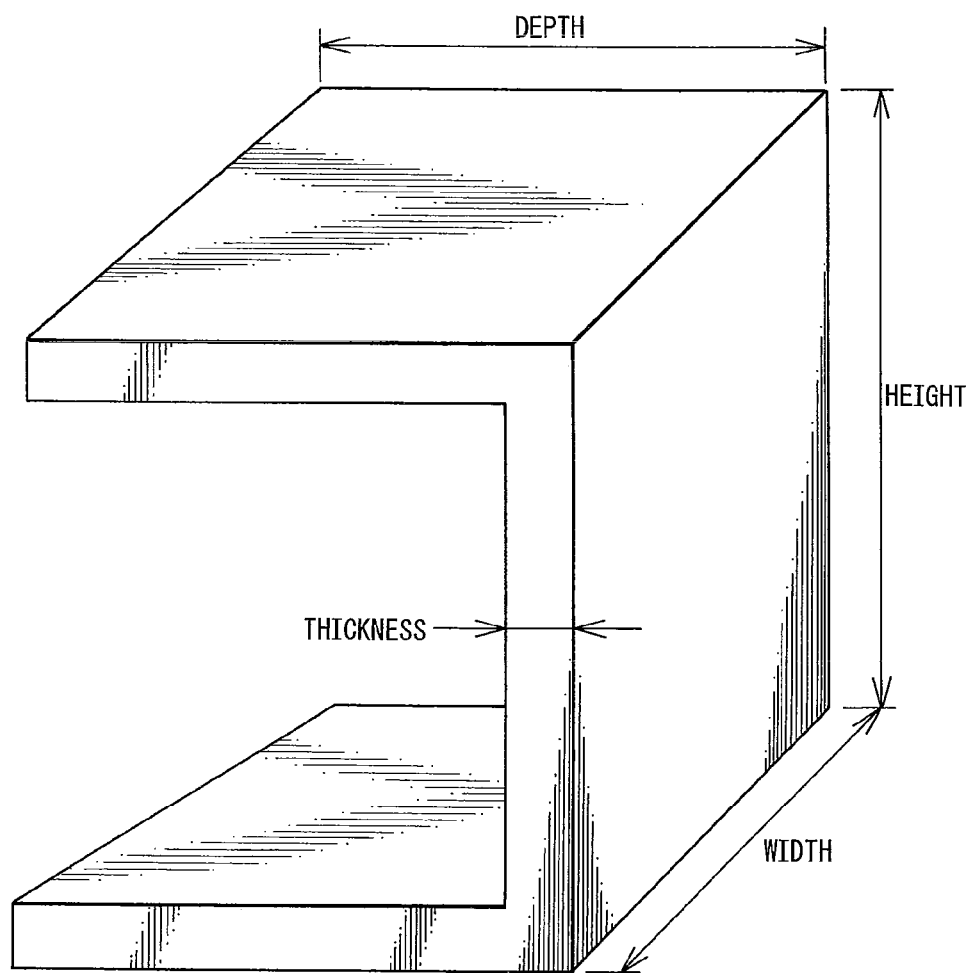
FIG. 24 is a schematic view showing the shape of a U-shaped core according to the embodiment.

In Example A, magnetic cores of the shape of a flat plate (FIG. 23) of a width of 10 cm, a thickness of 2 cm and a height of 40 cm were disposed at positions 5 cm away from the edge portions of the metal plate 1. In Example B, magnetic cores of the shape of a U-shape (FIG. 24) of a width of 5 cm, a thickness of 2 cm, a height of 50 cm and a depth of 20 cm were inserted in the outer sides of the central portions of the aslant induction coils by 10 cm from the edge portions of the steel plate to effect the heating. In Example C, the conditions were the same as those of Example B but inserting the magnetic cores by 5 cm from the edge portions of the steel plate. In Example D, the magnetic cores were similarly arranged at the positions of the edge portions of the steel plate.

Experiments were, further, conducted as Comparative Example E under the same conditions as in Examples A to C but without using the magnetic core, as Comparative Example F by arranging the induction coils in parallel as shown in FIG. 3 without slanted, and as Comparative Example G by the LF-type induction heating by overlapping the front and back induction coils one upon the other as shown in FIG. 1, and were compared with the Examples.

The rate of passing the plate was 7 m/min in Examples and in Comparative Examples.

The results were as shown in Table 1. Since the temperature differs before and after the heating, temperature deviations were compared by dividing a maximum amount of temperature rise of the steel plate by a minimum amount of temperature rise thereof (temperature deviation ratio=(maximum amount of temperature rise−minimum amount of temperature rise) maximum amount of temperature rise).

TABLE 1

|  |  | Temp. deviation ratio | Comment |
| --- | --- | --- | --- |
| Invention | Example A | 2.21 |  |
|  | Example B | 1.12 | Edge temp. < temp. at plate center |
|  | Example C | 1.03 |  |
|  | Example D | 1.82 |  |
| Comp. Ex. | Comp. Ex. E | 4.5 |  |
|  | Comp. Ex. F | 12.1 |  |
|  | Comp. Ex. G | — | could not be heated |

The frequency for heating was adjusted over 10 KHz±1 KHz.

In Comparative Example G using the conventional LF-type apparatus for induction heating, the heating could not be effected at all. In Comparative Examples E and F, the non-magnetic heating could be effected. When Comparative Examples E and F were compared, however, the temperature deviation was smaller in Comparative Example E in which the induction coils were aslant to the edge portions of the steel plate than in Comparative Example F in which the induction coils were arranged in parallel. However, the amount of temperature rise was large in the edge portions of the plate causing overheating. Besides, the edge portions of the plate were deformed like an edge wave. In Examples A, B, C and D according to the invention, on the other hand, it was confirmed that the temperature deviations were small. Even by simply placing the magnetic cores on the outer sides of the edge portions of the steel plate as in Example A, the effect was exhibited for suppressing the temperature at the edge portions as compared to Comparative Example E. When the magnetic cores covered much of the steel plate as in Example B, the effect was great for suppressing the temperature at the edge portions of the steel plate, and the edge portions of the steel plate were heated to a temperature lower than a temperature at the central portion of the plate. In Example C where the edge portions of the metal plate were covered over a decreased area, an optimum temperature distribution was attained. In the case of Example D where the magnetic cores were placed at the edge portions of the metal plate, the effect for suppressing the temperature at the edge portions was not as great as those of Examples B and C, but it was confirmed that the temperature deviation could be greatly suppressed at the edge portions. From the above experiment, it was confirmed that the temperature distribution for heating could be controlled relying upon the areas the magnetic cores covered the steel plate or the distance. In the above experiment, further, the heating could be effected without problem though the distance was as great as 200 mm between the steel plate and the induction coils.

Example 2

Induction coils of the shape of FIG. 8 were used, and a difference in the temperature distribution for heating was measured by using and not using the magnetic cores. The induction coils possessed a width of 150 mm like in Example 1, possessed long sides (sides on the outer sides in the direction in which the metal plate traveled) of a length of 50 cm over the portions where the front and back conductors were in parallel in the central portion of the plate, and possessed front and back conductors slanted at 45° toward both edge portions. The front and back induction coils were so arranged that the distance between the inner sides thereof was 20 cm in the direction in which the SUS304 plate traveled when they were vertically projected. As Example H of the invention, the heating was effected by inserting the magnetic cores of the U-shape having a width of 5 cm, a thickness of 2 cm, a height of 50 cm and a depth of 20 cm used in Example 1 inward from the edge portions of the metal plate by 50 mm (on the basis of longer sides) at right angles with the aslant central portions of the conductor coils. As Comparative Example I, further, the heating was effected under the same heating conditions as in Example 1 but without using the magnetic cores.

As a result, in the case of Comparative Example I, the temperature deviation ratio was 2.01 while in the case of Example H by using the magnetic cores, it was confirmed that the temperature deviation was greatly improved to 1.28.

Example 3

The front and back induction coils of a width of 150 mm were arranged being separated apart by 200 mm and slanted at 45° as shown in FIG. 14, and the temperature deviations were compared depending upon when the magnetic cores were arranged at the edge portions of the SUS304 plate and when they were not arranged. The magnetic cores that were used were the same as those of Examples 1 and 2. The temperature deviations were compared by pushing in the magnetic cores at a position 100 mm separated away from the points where the induction coils traversed the edge portions of the SUS304 as Example J of the invention and by using no magnetic core as Comparative Example K. In the case of Comparative Example K using no magnetic core, the temperature deviation ratio was 3.2 while in the case of Example J using the magnetic cores, it was confirmed that the temperature deviation ratio was improved up to 1.9.

Example 4

Induction coils of the shape of FIG. 18(a) were used, and a difference in the temperature distribution for heating was measured by using and not using the magnetic cores. The induction coils possessed a width of 150 mm like in Example 1, possessed long sides (sides on the outer sides in the direction in which the metal plate traveled) of a length of 50 cm over the portions where the front and back conductors were in parallel in the central portion of the plate, and were arranged in parallel with the edge portions of the plate at positions 150 mm away from both edge portions of the SUS304. The front and back induction coils were so arranged that the distance between the inner sides thereof was 40 cm in the direction in which the SUS304 plate traveled when they were vertically projected. The heating was effected by arranging the magnetic cores of the U-shape having a width of 5 cm, a thickness of 2 cm, a height of 50 cm and a depth of 20 cm used in Example 1 at positions 50 mm away from the positions where the front and back induction coils traversed the edge portions of the SUS 304 so as to cover the edge portions of the metal plate 50 mm inward of the metal plate. The temperature deviations were compared by using the magnetic cores as Example L of the invention and by using no magnetic core as Comparative Example M. The heating conditions were the same as in Example 1.

As a result, in the case of Comparative Example M, the temperature deviation ratio was 2.7 while in the case of Example L by using the magnetic cores, it was confirmed that the temperature deviation was greatly improved to 1.5.

The invention claimed is:

1. An induction heating apparatus for heating a metal plate, comprising:
   an induction coil surrounding the metal plate;
   a first conductor, which is a part of the induction coil, placed on a front surface side of the metal plate;
   a second conductor, which is a part of the induction coil, placed on a back surface side of the metal plate and connected to the first conductor; and
   a magnetic core arranged from the front surface side over to the back surface side of the metal plate bestriding an edge portion of the metal plate;
   wherein vertically projected images of the first and second conductors on the metal plate do not overlap each other in a lengthwise direction of the metal plate in a central portion of the metal plate in a widthwise direction thereof;
   at least one of the first and second conductors is arranged so as to be slanted relative to the widthwise direction of the metal plate, or the first and second conductors are so arranged as to be at least partly overlapped in the vertically projected images in the lengthwise direction of the metal plate at least at either edge portion of the metal plate in the widthwise direction thereof; and
   the magnetic core is arranged in an area except a space surrounded by the induction coil so as to produce flows of magnetic flux through the metal plate from the front or back surface to the opposite surface, which flows cancel minor loops of a current formed together with a passage of an induced current corresponding to a shape of arrangement of the first and second conductors, and induced at an outer side of the first and second conductors.

2. The induction heating apparatus as set forth in claim 1, wherein the vertically projected image of the conductors is of the shape of a hexagon, a trapezoid, a parallelogram, a rectangle, in which central portions of the image are parallel, a circle, an ellipse or parallel lines.

3. The induction heating apparatus as set forth in claim 1, wherein the magnetic core is provided so as to cover front surface side and back surface side of the edge portion of the metal plate.

4. The induction heating apparatus as set forth in claim 1, wherein the magnetic core is of the shape of a flat plate or of a U-shape in cross section.

5. The induction heating apparatus as set forth in claim 1, wherein the position of the magnetic core is variable relative to the metal plate.

6. The induction heating apparatus as set forth in claim 1, wherein the conductor of at least either the front surface side or the back surface side can be moved in the widthwise direction of the metal plate, and the magnetic core moves being interlocked to the conductors.

* * * * *